3,345,136
MULTI-STAGE SHIFT CONVERSION METHOD
FOR HYDROGEN PRODUCTION
James A. Finneran, Jr., Garden City, N.Y., and Leonard
C. Axelrod, Elizabeth, N.J., assignors to Pullman Incorporated, a corporation of Delaware
Filed Oct. 2, 1963, Ser. No. 313,308
5 Claims. (Cl. 23—213)

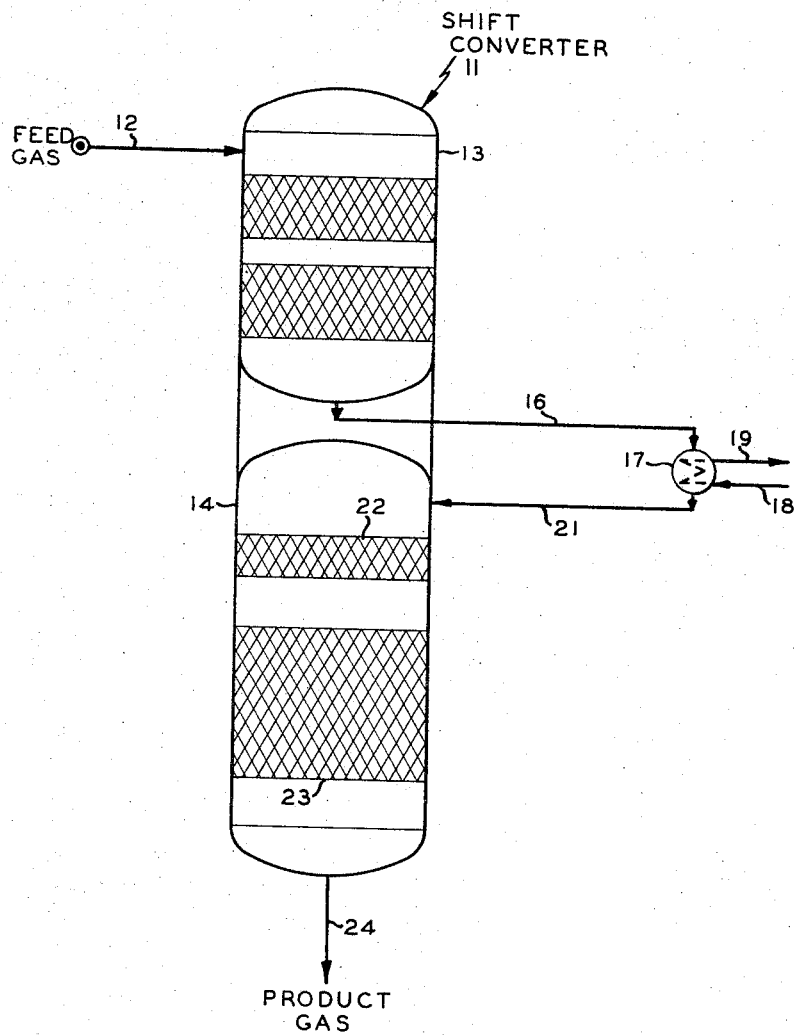

ABSTRACT OF THE DISCLOSURE

A shift conversion process, for the production of hydrogen from a gas containing carbon monoxide and sulfur, in which the gas is contacted with steam in the presence of a high temperature shift conversion catalyst, the sulfur being thereafter removed from the gas and the sweetened gas being then contacted with steam in the presence of a low temperature shift conversion catalyst to produce a gas low in carbon monoxide and enriched in hydrogen and carbon dioxide.

---

The present invention relates to the production of hydrogen and particularly to an improved multi-stage shift conversion process for the production of hydrogen from carbon monoxide and steam.

In many well known commercial processes a gas containing carbon monoxide is obtained from which it is desired to produce hydrogen. The hydrogen so produced is useful in relatively pure form in a variety of known hydrogenation processes. It is also useful combined with other gases as a synthesis gas, for example, ammonia synthesis gas where the hydrogen is combined with nitrogen. Regardless of the process for which the hydrogen is made, it is generally desirable that it contain a minimum of residual carbon monoxide. The carbon monoxide-containing gas is used to prepare hydrogen by reacting the carbon monoxide with steam in the presence of one or more catalysts in accordance with the well known water gas shift reaction:

$$CO + H_2O = CO_2 + H_2$$

This reaction involves an equilibrium which depends upon the prevailing temperature. Reaction in the right-hand direction is favored by relatively low temperatures. To obtain desirably low levels of residual carbon monoxide in the product gas and a correspondingly high degree of conversion to hydrogen, the process can be carried out in two stages. In the first stage, the carbon monoxide-containing gas is contacted in the presence of a relatively inexpensive shift conversion catalyst active at relatively high temperatures to convert the bulk of the carbon monoxide. The exothermic heat of reaction and a substantial portion of the sensible heat of the partially shifted gas is removed by cooling. The cooled gas is then contacted in the presence of a relatively more expensive shift conversion catalyst active at relatively low temperatures to produce additional hydrogen under equilibrium conditions which favor a low residual proportion of carbon monoxide.

The two stage process uses standard commercially available catalysts which are known in the art as "high temperature shift catalysts" and "low temperature shift catalysts." Both of these classes of catalysts are subject to poisoning by sulfur present in the feed gas. In the case of the low temperature shift catalyst, the presence of sulfur presents a particularly serious problem because even modest amounts of sulfur will cause a rapid and permanent loss of activity for catalysis of the shift reaction.

It is known to subject the original feed gas to a preliminary desulfurization treatment at the relatively high temperature conditions at which the feed gas is introduced into the process in order to protect both catalysts against poisoning. Although many desulfurization treatments are known and are generally satisfactory, it is found that sulfur removal is not complete and that, accordingly, the life of the low temperature shift catalyst is shorter than would be desired.

It is an object of the invention to provide an improved multi-stage shift conversion process for the production of hydrogen from carbon monoxide and steam.

Another object of the invention is to provide an efficient and economical shift conversion process based on a feed containing modest amounts of sulfur characterized by a relatively longer life for the low temperature shift catalyst used than is obtained with presently known processes.

Various other objects and advantages of the invention will be apparent to those skilled in the art from the following detailed discussion and description and from the accompanying drawing which is a diagrammatic sketch in elevation of suitable apparatus for performing a preferred embodiment of the invention.

The foregoing objects are accomplished in accordance with the invention by the process which comprises contacting a gas containing carbon monoxide and sulfur with steam in the presence of shift conversion catalyst at temperatures in the range of about 600 to about 850° F. to produce gas enriched in hydrogen and carbon dioxide, cooling the enriched gas to a temperature in the range of about 430 to about 530° F., removing sulfur from the cooled gas to produce sweetened gas and contacting sweetened gas with steam in the presence of shift conversion catalyst at temperatures in the range of about 430 to about 550° F. to produce gas low in carbon monoxide and enriched in hydrogen and carbon dioxide.

The process is not limited to any particular source for the original feed gas containing carbon monoxide and sulfur. In commercial practice the principal sources of such gas are processes in which mixtures of hydrogen and carbon monoxide are generated from hydrocarbons. Examples of such well known gas generation processes include steam reforming and partial oxidation. The former involves catalytic reaction with steam and, in some cases, oxygen as well. The latter involves non-catalytic reaction with oxygen.

The carbon monoxide-containing gas introduced into the process contains sulfur in modest amounts, varying typically from about 0.1 to about 10 parts per million (p.p.m.). This sulfur is generally introduced into the process by reason of its presence in the hydrocarbon feed to the prior gas generation process. The indicated amounts of sulfur are present even though the hydrocarbon feed to such prior gas generation process has been given a preliminary desulfurization treatment. As used herein, the term "sulfur" has its usual meaning in the art in this context, i.e., it refers to a normally gaseous material selected from the group consisting of hydrogen sulfide, carbonyl sulfide and their mixtures. A typical shift converter feed gas will contain sulfur of which about 90% is hydrogen sulfide and about 10% is carbonyl sulfide. The relative proportions of carbon monoxide and other gases (hydrogen, carbon dioxide, methane, nitrogen, argon, etc.) in the carbon monoxide-containing gas supplied to the present process varies depending upon the source of the gas. Typical values are indicated by the ranges set forth in Table I below for an unshifted ammonia synthesis gas prepared by primary and secondary reforming:

*Table I*

| | Mol percent of dry gas |
|---|---|
| CO | 2–20 |
| $CO_2$ | 5–15 |
| $CH_4$ | 0.1–1.0 |
| A | 0.1–1.0 |
| S | (1) |

[1] 0.1 to 10 p.p.m.

The balance of this gas consists essentially of hydrogen and nitrogen. The term "dry gas" includes all components of the feed gas excepting steam.

Steam is added if necessary to the carbon monoxide-containing gas to provide a relatively low ratio of steam to dry gas preferably in the range of about 0.5 to about 1.0. In many existing shift conversion processes, substantially higher ratios of steam to dry gas are used in order to reduce the proportion of carbon monoxide in the reacted gas at equilibrium. One of the advantages of the present process resides in this feature of producing a gas low in carbon monoxide with a relatively low inlet steam-to-gas ratio.

The reactants are then contacted in the presence of shift conversion catalyst at temperatures in the range of about 600 to about 850° F. The water gas shift reaction which occurs is exothermic thereby raising the temperature of the gas in the course of its passage over the catalyst. For this reason, inlet temperatures are maintained in the range of about 600 to about 750° F. Outlet temperatures are higher and are maintained in the range of about 650 to about 850° F. Any high temperature shift conversion catalyst can be used. Such catalysts are well known and are commercially available. The catalyst can be essentially any polyvalent metal or oxide thereof. Usually, however, an oxide of a group VIII metal having an atomic number not greater than 28 and an oxide of the left-hand elements of group VI are used. The catalysts include, for example, iron oxide, nickel oxide, cobalt oxide, chromia, molybdena and tungsten oxide. Space velocities are maintained in the range of about 500 to about 5000 volumes of dry gas at standard conditions (60° F. and atmospheric pressure) per hour per volume of catalyst. Under these conditions, the bulk of the carbon monoxide reacts with steam to produce a gas having a residual carbon monoxide content in the range of about 1.0 to about 5.0 mol percent of the dry gas. This gas is correspondingly enriched in hydrogen and carbon dioxide. The sulfur content of the gas is essentially unaffected although the following reaction will take place affecting the particular form of sulfur present:

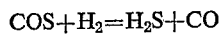
$$COS + H_2 = H_2S + CO$$

The partially shifted gas is then cooled to a temperature in the range of about 430 to about 530° F. Cooling can be accomplished in any suitable way, for example, by quenching with water or steam and/or by indirect heat exchange with cooler fluids. The latter method is preferred where the heat thus extracted can be used elsewhere in the process as is frequently the case where the heat available can be transferred to boiler feed water for direct or indirect production of steam.

The cooled gas is then treated in accordance with the invention for the removal of sulfur. This is accomplished by contacting the gas with a metal oxide reactive with the sulfur therein to form the corresponding metal sulfide and water. Zinc oxide is the preferred metal oxide in this service, although other reactive metal oxides such as iron oxide with or without modification with alkaline material can be used in lieu of or in conjunction with zinc oxide. The desulfurization step is illustrated in the case of zinc oxide by the reaction:

$$ZnO + H_2S = ZnS + H_2O$$

Desulfurization at this point in the process is important as it leads directly to more complete sulfur removal than can be accomplished at the higher temperatures prevailing at all points upstream from this point. The reason for the better sulfur removal resides in the fact that the reaction between the metal oxide and the sulfur involves an equilibrium which is favored in the right-hand direction by lower temperature. Because of the improved sulfur removal, the life of the low temperature shift conversion catalyst which is subsequently used is substantially improved.

Conditions used in the sulfur removal step include space velocities in the range of about 5000 to about 15,000 volumes of dry gas measured at standard conditions per hour per volume of metal oxide. These space velocities provide contact time in the range of about 1 to about 5 seconds. Under these conditions, the residual sulfur content in the gas is reduced to less than about 0.1 p.p.m.

The metal oxide gradually becomes spent by conversion to the metal sulfide. While the spent material can be regenerated in situ by roasting in the presence of oxygen, it is generally more practical to simply discard the spent material and replace it with fresh material. With the inlet sulfur contents and space velocities indicated above, the amount of metal oxide material required is quite small and its life will nevertheless be a year or more, so that replacement does not present a serious economic problem.

The cooled and sweetened gas is then contacted with steam in the presence of shift conversion catalyst at temperatures in the range of about 430 to about 550° F. Some additional exothermic reaction takes place resulting in a gas temperature rise. Inlet temperatures therefore are about 430 to about 530° F. It is unnecessary to further cool the gas prior to this stage of shift conversion since all necessary cooling is preferably accomplished prior to the sulfur removal step. Outlet temperatures are higher and in the range of about 450 to about 550° F. Steam-to-gas ratios in the range given above for the higher temperature stage of shift conversion are used for the low temperature stage of shift conversion as well. Steam can be added between the stages although this is generally not necessary since there is sufficient excess steam initially to provide the requirements throughout the process. Any low temperature shift conversion catalyst can be used. Such catalysts are well known and are commercially available. One such catalyst is described, for example, in U.S. 1,809,978 to Larson, issued June 16, 1931, consisting of copper, zinc and one or more of the elements selected from the group consisting of chromium, tungsten, silicon, vanadium and molybdenum, with all of these elements being present in either a free or chemically combined state.

Conditions used include space velocities in the range of about 500 to about 5000 volumes of dry gas at standard conditions per hour per volume of catalyst. Pressures used throughout the process have no substantial effect upon any of the reactions so that any desired pressure can be used. Typically pressures will be between about 0 and about 400 p.s.i.g., reflecting the pressure at which the feed gas is available from the gas generation steps. It is preferred to carry out all steps of the process at substantially the same pressure. As a result of the low temperature stage of shift conversion a typical range of gas composition related to the range set forth in Table I above is as set forth in Table II below:

Table II

| | Mol percent of dry gas |
|---|---|
| CO | 0.05–1.0 |
| $CO_2$ | 5–25 |
| $CH_4$ | 0.1–1.0 |
| A | 0.1–1.0 |

The balance of the gas will again consist essentially of hydrogen and nitrogen.

As will be understood by those skilled in the art, the foregoing arrangement of catalysts and temperatures in combination permits efficient shift conversion, with relatively low inlet steam-gas ratio, with gas containing modest quantities of sulfur to produce a gas low in carbon monoxide. By practicing sulfur removal at relatively low temperatures between stages of shift conversion, the life of the low temperature shift catalyst can be extended with corresponding improvement in the overall efficiency and economy of the process. The foregoing advantages result even though the feed gas containing modest quantities of sulfur is permitted to contact the high temperature shift conversion catalyst without a preliminary desulfurization. The indicated quantities of sulfur do not seriously or permanently impair the activity of the high temperature shift conversion catalyst. It will remain highly active for the reaction for a period of years. While a preliminary desulfurization treatment of the original feed gas is not considered necessary, such treatment can be used if so desired in conjunction with the present process. In such case, it will still be desirable to desulfurize at relatively lower temperatures between stages of shift conversion in order to obtain further sulfur removal and the advantages associated therewith.

Various other modifications of the specific process disclosed can also be used without departure from the process of the invention. Thus, it is sometimes desired to have two or more stages of high temperature shift conversion or two or more stages of low temperature shift conversion in order to control temperature by cooling between stages or to permit use of a plurality of catalysts or both. In all such cases, it will be advantageous to desulfurize at relatively low temperatures prior to contacting the gas in the presence of low temperature shift catalyst.

The gas produced by the process is low in carbon monoxide and can be further processed in any suitable way to provide the desired product. It can be treated for the removal of carbon dioxide, for example, by contacting the gas with a regenerable ethanolamine or other absorbent. Residual carbon monoxide can be removed, for example, by contacting the gas with a regenerable cuprous ammonium acetate or other absorbent or by reaction with hydrogen in the presence of a suitable methanation catalyst. In these and other known ways, commercially pure hydrogen or synthesis gas is ultimately produced.

The invention will be further illustrated by a specific example of an embodiment of the invention using the apparatus shown on the drawing. Referring to the drawing, feed gas is introduced into a unitary shift converter 11 through line 12. This gas is at a temperature of about 701° F. and a pressure of about 265 p.s.i.g. Its composition is set forth in Table III below:

Table III

| | Mol percent of dry gas |
|---|---|
| $H_2$ | 52.1 |
| $N_2$ | 21.4 |
| CO | 15.5 |
| $CO_2$ | 10.4 |
| $CH_4$ | 0.3 |
| A | 0.3 |
| | 100.0 |

| | Mol percent of dry gas |
|---|---|
| S | p.p.m. 0.5 |

The feed gas in line 12 is obtained by primary and secondary reforming of naphtha with steam and air. The feed gas includes steam providing a mol ratio of steam to dry gas of about 0.72 and it contains 0.5 p.p.m. sulfur. Shift converter 11 includes an upper reactor 13 and a lower reactor 14. Upper reactor 13 contains two beds of a standard high temperature shift conversion catalyst, in this case chromium promoted iron oxide. Approximately 590 cubic feet of this catalyst are provided. The overall space velocity is about 2800 volumes of dry gas at standard conditions per hour per volume of catalyst.

As a result of the reaction in upper reactor 13, the product gas in line 16 is at a temperature of about 821° F. Its carbon monoxide content is reduced to about 3.7 mol percent of the dry gas. It is cooled to a temperature of about 450° F. by indirect heat exchange with boiler feed water in exchanger 17. The boiler feed water is introduced through line 18 and is passed through line 19 to the steam generation system of the plant (not shown). The cooled gas is passed through line 21 to lower reactor 14 which contains two beds of contact material 22 and 23.

Bed 22 is made up of about 197 cubic feet of particulate zinc oxide. This volume of material provides a space velocity of about 8,800 volumes of dry gas at standard conditions per hour per volume of zinc oxide and a contact time of about 3 seconds. Substantially all of the sulfur originally present reacts with the zinc oxide and is thereby removed. With the volume of zinc oxide provided in this case, its life will be approximately two years.

The sweetened gas from bed 22 then contacts bed 23 which consists of about 640 cubic feet of standard low temperature shift conversion catalyst, in this case copper promoted zinc, providing a space velocity of about 2800 volumes of dry gas at standard conditions per hour per volume of catalyst.

As a result of the further reaction which takes place in bed 23, the temperature of the gas is raised from about 450° F. to about 487° F., yielding a product gas in line 24 having the composition given in Table IV below:

Table IV

| | Mol percent of dry gas |
|---|---|
| $H_2$ | 58.3 |
| $N_2$ | 18.7 |
| CO | 0.5 |
| $CO_2$ | 22.1 |
| $CH_4$ | 0.2 |
| A | 0.2 |
| | 100.0 |

The steam-to-gas ratio of the product gas is about 0.49. This gas is low in carbon monoxide and is suitably further processed to produce ammonia synthesis gas.

Having thus described the invention by reference to a specific example thereof, it should be understood that no undue limitations or restrictions are to be imposed thereby, but that the present invention is defined by the appended claims.

What is claimed is:

1. A process for the production by hydrogen which comprises
   (a) contacting a gas containing carbon monoxide and sulfur with steam in the presence of a high temperature shift conversion catalyst at temperatures in the range of about 600 to about 850° F. to produce gas enriched in hydrogen and carbon dioxide,
   (b) cooling said enriched gas to a temperature in the range of about 430 to about 530° F.,
   (c) removing sulfur from said cooled gas to produce sweetened gas, and
   (d) contacting said sweetened gas with steam in the presence of a low temperature shift conversion catalyst at temperatures in the range of about 430 to about 550° F. to produce gas low in carbon monoxide and further enriched in hydrogen and carbon dioxide.

2. A process for the production of hydrogen which comprises
(a) contacting a gas containing carbon monoxide and sulfur in an amount between about 0.1 and about 10 parts per million with steam providing a ratio of steam to dry gas of between about 0.5 and about 1.0 in the presence of a high temperature shift conversion catalyst providing a space velocity in the range of about 500 to about 5000 volumes of dry gas measured at standard conditions per hour per volume of catalyst at temperatures in the range of about 600 to about 850° F. to produce gas enriched in hydrogen and carbon dioxide,
(b) cooling said enriched gas to a temperature in the range of about 430 to about 530° F.,
(c) contacting said cooled gas with zinc oxide providing a space velocity in the range of about 5000 to about 1,500 volumes of dry gas measured at standard conditions per hour per volume of zinc oxide to produce sweetened gas, and
(d) contacting said sweetened gas with steam providing a ratio of steam to dry gas of between about 0.5 and about 1.0 in the presence of a low temperature shift conversion catalyst providing a space velocity of about 500 to about 5000 volumes of dry gas measured at standard conditions per hour per volume of catalyst at temperatures in the range of about 430 to about 550° F. to produce gas low in carbon monoxide and further enriched in hydrogen and carbon dioxide.

3. In a process for the production of hydrogen comprising
(a) contacting a gas containing carbon monoxide and sulfur with steam in the presence of a high temperature shift conversion catalyst at temperatures in the range of about 600 to about 850° F. to produce gas enriched in hydrogen and carbon dioxide,
(b) cooling said enriched gas to a temperature in the range of about 430 to about 530° F., and
(c) contacting said cooled gas with steam in the presence of a low temperature shift conversion catalyst at temperatures in the range of about 430 to about 550° F., the improvement which comprises
(d) contacting said cooled gas from step (b) with a metal oxide reactive with sulfur to remove sulfur and produce sweetened gas for treatment in step (c), whereby the life of the shift conversion catalyst used in step (c) is extended.

4. The process defined in claim 3 in which said metal oxide is zinc oxide.

5. The process defined in claim 4 in which the volume of zinc oxide used provides a space velocity in the range of about 5000 to about 15,000 volumes of dry gas measured at standard conditions per hour per volume of zinc oxide.

References Cited

UNITED STATES PATENTS

| 1,809,978 | 6/1931 | Larson | 23—213 |
| 2,110,240 | 3/1938 | Roelen et al. | 23—3.1 |
| 2,487,981 | 11/1949 | Reed | 23—213 |
| 3,010,807 | 11/1961 | Christensen et al. | 23—213 X |
| 3,074,783 | 1/1963 | Paull | 23—213 X |
| 3,128,163 | 4/1964 | Weittenhiller et al. | 23—213 X |

FOREIGN PATENTS

| 594,285 | 3/1960 | Canada. |
| 254,288 | 1/1927 | Great Britain. |
| 345,067 | 3/1931 | Great Britain. |

OSCAR R. VERTIZ, *Primary Examiner.*

B. H. LEVENSON, *Assistant Examiner.*

UNITED STATES PATENT OFFICE
CERTIFICATE OF CORRECTION

Patent No. 3,345,136                      October 3, 1967

James A. Finneran, Jr. et al.

It is hereby certified that error appears in the above numbered patent requiring correction and that the said Letters Patent should read as corrected below.

Column 4, line 22, for "provided" read -- proved --; column 7, line 20, for "1,500" read -- 15,000 --.

Signed and sealed this 21st day of January 1969.

(SEAL)
Attest:

Edward M. Fletcher, Jr.                      EDWARD J. BRENNER
Attesting Officer                             Commissioner of Patents